May 8, 1962 J. T. SALIHI 3,033,997

PUSH-PULL SEQUENCING GATE DRIVEN FROM MAGNETIC CORE CIRCUIT

Filed May 20, 1959 2 Sheets-Sheet 1

INVENTOR.
JALAL T. SALIHI

BY Lippincott & Ralls

ATTORNEYS

May 8, 1962 J. T. SALIHI 3,033,997

PUSH-PULL SEQUENCING GATE DRIVEN FROM MAGNETIC CORE CIRCUIT

Filed May 20, 1959 2 Sheets-Sheet 2

INVENTOR.
JALAL T. SALIHI
BY Lippincott & Ralls
ATTORNEYS

United States Patent Office 3,033,997
Patented May 8, 1962

3,033,997

PUSH-PULL SEQUENCING GATE DRIVEN FROM MAGNETIC CORE CIRCUIT

Jalal T. Salihi, San Carlos, Calif., assignor to Lenkurt Electric Company, Inc., San Carlos, Calif., a corporation of Delaware Filed May 20, 1959, Ser. No. 814,598
5 Claims. (Cl. 307—88.5)

Figure 1B:
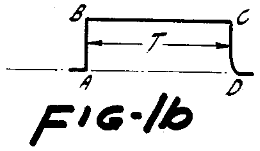

This invention relates to pulse translating circuits and more particularly to circuits for translating (e.g., over a telephone line) signals of two different frequencies alternately responsive to the leading and trailing edges of incoming (e.g., dial) pulses.

In the exemplary embodiments of the present invention, a saturable magnetic core circuit is used in conjunction with a gating circuit for placing a pair of frequencies alternately on a transmission line for use in an inband signaling system for transmitting telephone dial pulses over carrier channels and the like. Naturally, the pulse translating circuit is not at all limited to this use.

A feature of the invention pertains to the use of at least one saturable core and the time delay inherent therein when the polarity of the flux is switched from one saturated state to the other.

More particularly, this feature of the invention is characterized by the use of at least one saturable core normally biased to a saturated condition of one polarity, means for shifting the saturable core to the other polarity, which means is responsive to the leading edge of incoming pulses, and means responsive to the induced pulse in an output winding of the core during the shift of flux in the saturable core to place one of two oscillators of known frequencies across a pair of conductors.

Another feature of the invention pertains to bridge rectifiers cooperating with switches responsive to the shift pulses of magnetic cores and with oscillators to apply preselected frequency signals in a preselected sequence to an output circuit.

Yet another feature pertains to the use of transistors controlled by the change in the saturated state of saturable cores to connect signals of preselected frequencies alternately to an external circuit, said transistors being so connected to the output windings of the cores that the asymmetric impedance characteristics of the transistors materially affect the flux changes in the cores, as is more fully explained hereinafter.

Still another feature of the invention pertains to the combination of two saturable cores, each having a pair of input windings and an output winding and biasing means, means responsive to input signals to connect one of two oscillators alternately to an external circuit in response to the switching of one of the saturable cores from its negative to positive saturated state and of the other of said cores from its positive to negative saturated state.

More specifically, a pair of similar, saturable magnetic cores have continually energized bias windings providing sufficient ampere-turns magnetizing force of one polarity to saturate both cores, bucking windings that receive input pulses and provide greater ampere-turns magnetizing force of the opposite polarity, whereby each input pulse reverses the magnetizations of both cores, output windings controlling a pair of switching transistors arranged to conduct current alternately, the two transistors being controlled by different ones of the two cores and the two cores having oppositely unbalanced switching times (introduced by the asymmetric properties of transistors) such that each transistor remains conductive as long as the other is cut off in a normal input pulse sequence. Each transistor, when conductive, connects a different frequency source to an output circuit, e.g., a telephone transmission line.

The exemplary pulse translating circuits of the present invention can be employed in an Inband Signaling System of the type disclosed and claimed in a copending application of Henry G. Kuhn, Serial No. 808,709, filed April 14, 1959 and in my copending application Serial No. 814,597 disclosing and claiming an Inband Signaling System, filed on an even date herewith. In the Kuhn invention, the transmitter utilizes a pulse transformer for detecting the leading and trailing edges of incoming signaling pulses. The present invention constitutes a decided advance over the transmitter circuit employed in the Kuhn signaling system since the time delay between the application of shift current to a saturable core and the actual shift of the magnetic flux in the core is relatively constant. It provides a sharp rise time in the order of ten microseconds or less. Then too, in the second and preferred embodiment of the present invention, which employs a pair of saturable cores, the pulse translating circuit is made substantially independent of duty cycle and the parameters of the switching circuit. The latter embodiment, at least, has the obvious advantage of permitting the circuit to be operated far more versatilely than a circuit including a pulse transformer.

These and other obects and features of the present invention will be more fully understood when the following detailed description is read with reference to the drawings, in which the winding polarities are indicated by the well-known dot convention: the dots adacent to one terminal of each winding indicate terminals of like induced-voltage polarity.

Figure 1C:
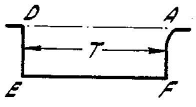
Figure 1A:
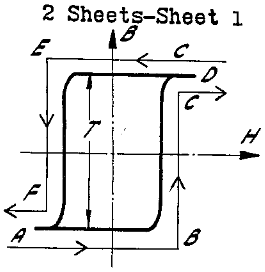
Figures 2, 3:
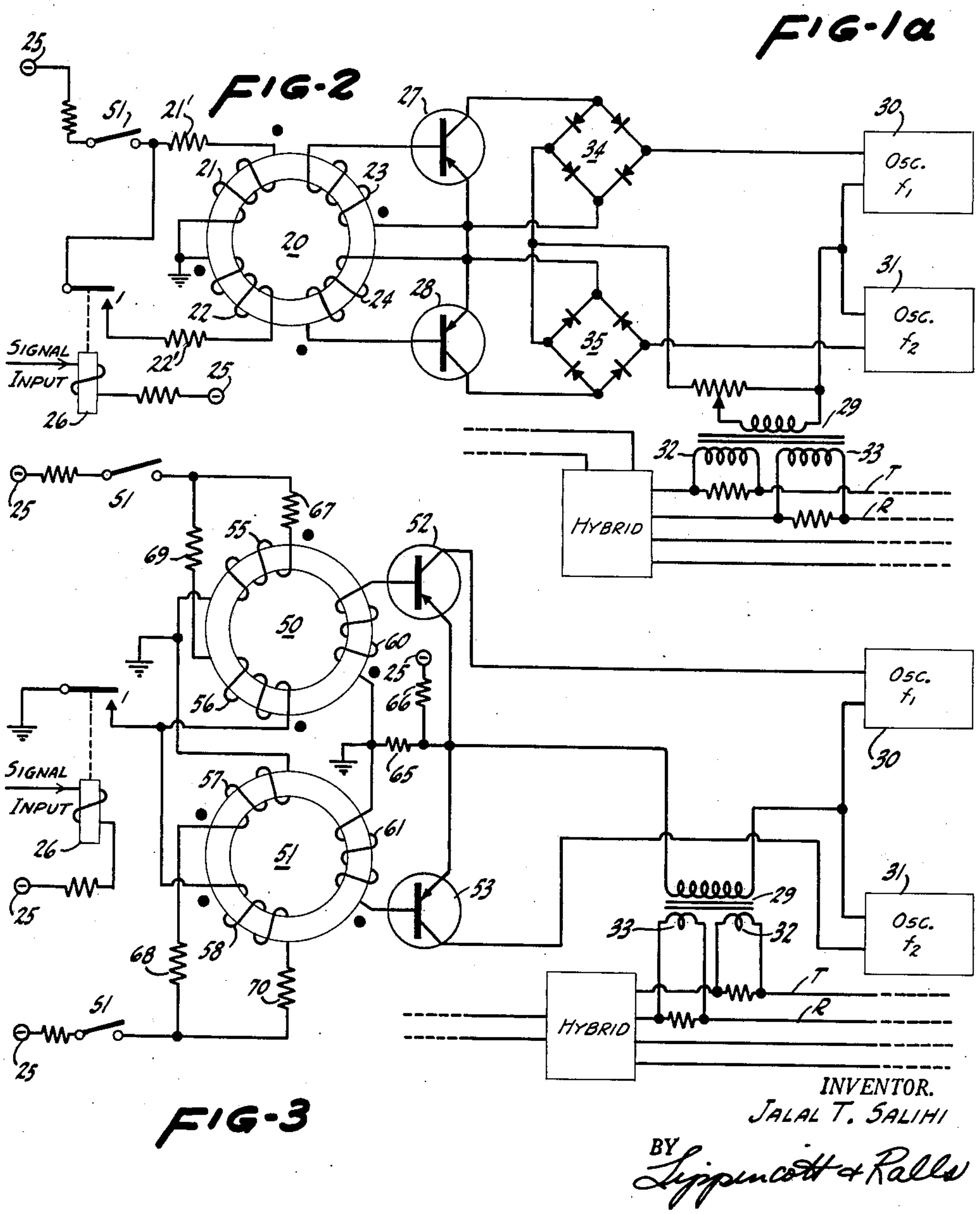
Figures 4, 5A, 6A, 7A, 8, 9, 10, 11:
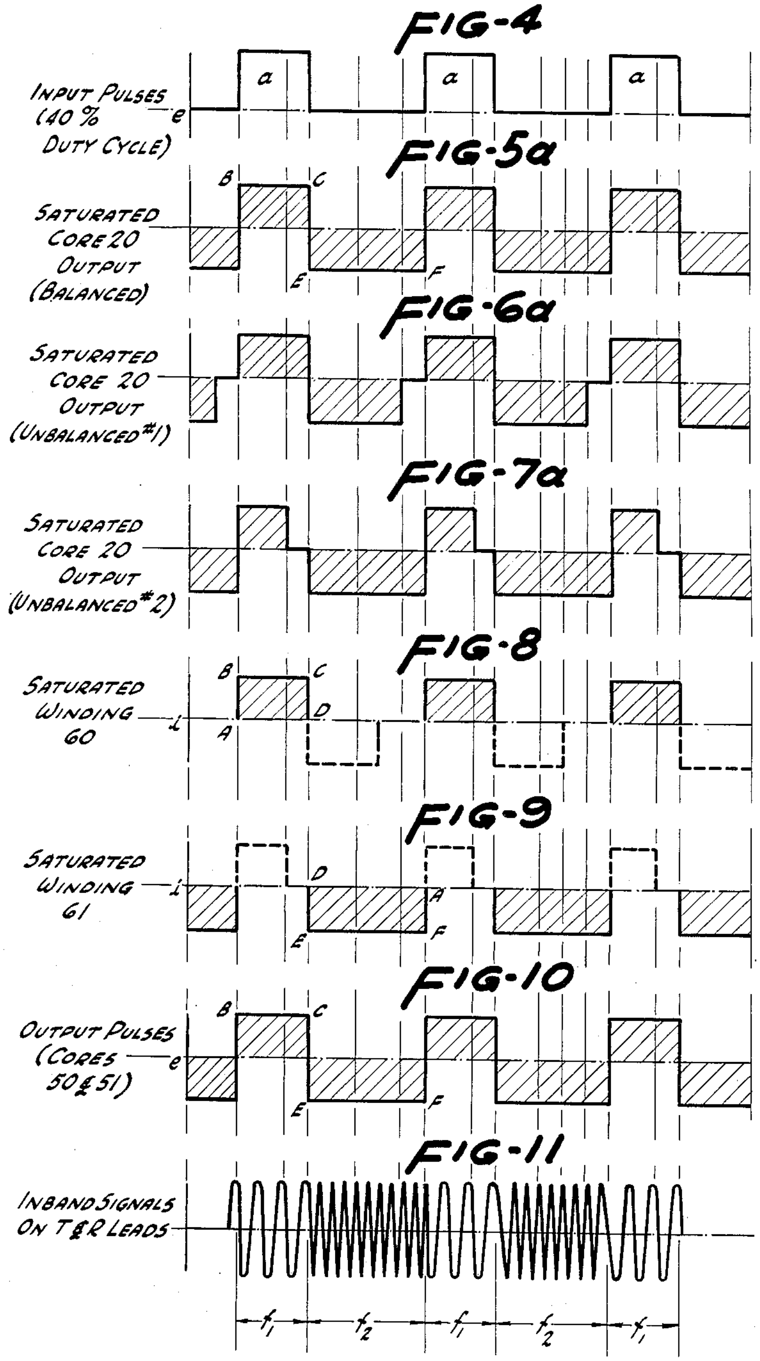
Figure 5B:
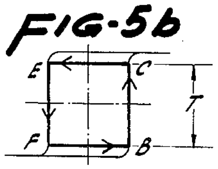
Figure 6B:
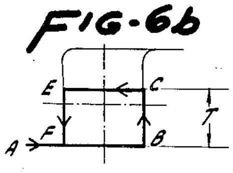
Figure 7B:
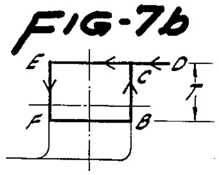

FIG. 1*a* illustrates the typical square hysteresis loop of a saturable core;

FIGS. 1*b* and 1*c* exemplify positive and negative shift pulses of the exemplary saturable core of FIG. 1*a*;

FIG. 2 is a first exemplary embodiment of the present invention employing a single saturable core;

FIG. 3 is a second exemplary embodiment of the present invention employing two saturable cores; and FIGS. 4–11 represent key waveforms of the first and second exemplary embodiments, coordinated along a time axis, more particularly, FIG. 4 represents a series of incoming dial pulses on a 40% duty cycle, FIG. 5*a* represents the total current flowing in the two output windings 23 and 24 of the core of the first preferred embodiment of FIG. 2 when the circuit components are balanced, the pulses B—C being the base current of transistor 27 flowing downward through winding 23 and the pulses E—F being the base current of transistor 28 flowing upward through winding 24, FIG. 5*b* illustrates the path of the flux build-up for the balanced core circuit of FIG. 5*a*, FIG. 6*a* represents the total current in the output windings of the core of the first preferred embodiment when the circuit components are unbalanced toward one (herein designated for convenience the negatively) saturated state, FIG. 6*b* illustrates the path of flux build-up for the unbalanced condition of FIG. 6*a*, FIG. 7*a* represents the total current in the output windings of the core of the first preferred embodiment when the circuit components are unbalanced toward the other (herein designated for convenience the positively) saturated state, FIG. 7*b* illustrates the path of flux build-up for the unbalanced condition of FIG. 7*a*, FIG. 8 illustrates the waveform of the current in the output winding 60 of core 50 of the second exemplary embodiment of FIG. 3, the broken lines representing portions of the hypothetical waveform which are, in practice, eliminated by the asymmetric (half-wave rectifying) characteristics of transistor 52, FIG. 9 illustrates the waveform of the current in the output winding 61 of core 51 of the second exemplary embodiment of FIG. 3, the broken lines representing portions of the hypothetical waveform which are, in practice, eliminated by the asymmetric (half-wave rectifying) characteristics of transistor 53, FIG. 10 illustrates the total current flowing in the two output windings 60 and 61 of cores 50 and 51 of the second exemplary embodiment, and FIG. 11 illustrates the inband signals on leads T and R resulting from the operation of the preferred embodiments of the present invention.

Looking to the single core embodiments of FIG. 2, it will be seen that the pulse translating circuit includes a saturable core 20, a pair of input windings 21 and 22, and output windings 23 and 24. A switch $S_1$ is operable to complete a circuit from the negative terminal of battery 25 through primary winding 21 to ground, thereby normally biasing core 20 toward its negatively saturated state. This is an on-off switch, which normally remains closed while the circuit is in use, providing a continuous magnetic bias to the core. The negative terminal of battery 25 is also connected through the wiper and front contact 1 of signal relay 26, when operated, and primary winding 22 to ground. Thus, whenever signaling pulses are connected to one side of the winding of relay 26, since the other side is connected to the negative terminal of the battery 25, the relay operates completing a circuit including primary winding 22. This energizes winding 22 in bucking relation to winding 21. The impedances of windings 21 and 22, including the series resistors 21′ and 22′ in series therewith, as well as the turn ratio of the windings, are so chosen that the ampere-turns magnetizing force of winding 22 exceeds that of winding 21, whereby the direction of magnetization of core 20 is reversed by operation of relay 26, and reverts to its initial direction when the relay releases.

One terminal of output winding 23 is connected to the base of a switching transistor 27 and one terminal of output winding 24 is connected to the base of the switching transistor 28. The emitters of the transistors 27 and 28 are connected together and the collectors thereof are connected to terminals of respective bridge rectifiers 34 and 35. The opposite terminals of the bridge rectifiers 34 and 35 are commonly connected to the emitters of transistors 27 and 28 and other terminals of output windings 23 and 24. One of the output terminals of each of the two bridge rectifiers 34 and 35 is commoned to one terminal of the primary of a coupling transformer 29, whereas the other output terminals of the two rectifiers 34 and 35 are connected respectively to oscillators 30 and 31, pre-tuned to frequencies $f_1$ and $f_2$ respectively. The other remaining terminals of the oscillators 30 and 31 are commoned to the other terminal of the primary of the coupling transformer 29.

Secondary winding 32 of the coupling transformer 29 shunts a series resistor in the transmission lead T, and the secondary winding 33 of the coupling transformer 29 shunts a series resistor in the transmission lead R. With only small voltages applied to the collector terminals of the transistors by the bridge rectifiers, each of the two resistors is essentially nonconductive or cut off until a negative pulse is applied to its base, whereupon currents flow from the emitter to the base and the collector.

With the circuit arranged as heretofore explained, whenever relay 26 operates in response to a signal input, battery 25 is applied over contact 1 of relay 26 to winding 22. This completes a circuit for the winding 22 and since it is poled oppositely to bias winding 21 and dominates it, it causes the core 20 to shift to its positive saturated state after a time delay T. During the time delay T pulses are induced in output windings 23 and 24, having negative voltage polarity at the base of transistor 27 and positive voltage polarity at the base of transistor 28. These pulses cause transistor 27 to conduct current through the bridge rectifier 34 which connects oscillator 30 to the transmission lines T and R. As a result, an $f_1$ signal is placed on the line, via coupling transformer 29. Meanwhile, the base current of transistor 27 flows through winding 23 and opposes any change in the magnetic flux of core 20. If the closed circuit through winding 23 and the emitter-base junction of transistor 27 had zero resistance, the current therein would perfectly oppose any tendency for the magnetic flux in core 20 to change, and would delay such change indefinitely. In practice, the rate of change of the flux is inversely related to the resistance of said closed circuit. Transistor 28 being cut off at this time, the circuit through winding 24 has a high resistance and offers negligible opposition to the reversal of magnetic flux.

Ordinarily, the time that it requires for core 20 to shift from its negative state to its positive one exceeds the time during which the input signal pulse at relay 26 maintains a closed circuit for input winding 22 of the core 20. Therefore, when the circuit path for winding 22 is interrupted, the bias winding 21 takes over and starts the core 20 towards its normal quiescent, negatively saturated, state. As soon as core 20 starts towards its negative saturated condition, transistor 27 cuts off since a positive going voltage is placed on the base thereof. At the same time, the voltage induced in winding 24, as a result of the bias winding 21 taking control, causes transistor 28 to conduct. This completes the circuit for bridge rectifier 35 to connect oscillator 31 across the transmission lines T and R, which in turn places an $f_2$ signal on the line. Now the rate of change of flux is controlled chiefly by the resistance of the closed circuit loop comprising winding 24 and the emitter-base junction of transistor 28. Again, as soon as a new dial pulse actuates signaling relay 26, transistor 28 cuts off and transistor 27 conducts, and the cycle repeats.

If everything is properly balanced, the resulting signal placed on the transmission lines T and R will appear similar to that shown in FIG. 11. The alternate bursts of signals of frequency $f_1$ and frequency $f_2$ are placed on the T and R conductors for use in a specific circuit, but the technique for connecting the oscillators 30 and 31 thereto has much broader applicability. Looking to the exemplary waveforms, particularly FIGS 4–7, the operation of the preferred embodiment of FIG. 3 may be understood more completely. FIG. 4, as noted previously, illustrates exemplary dial pulses incoming to the signaling relay 26. Assuming that the relay 26 operates and releases without delay, or at least with constant delays, a current path through input winding 22, due to the presence of one of the dial pulses *a*, is completed. Assuming that the core 20 is in its negatively saturated condition, as a result of bias current flowing in winding 21, the leading edge of the dial pulse operates relay 26 to place the negative terminal of battery 25 on one side of input winding 22, which causes the core 20 to start to desaturate. During this transition period, the flux in the saturable core 20 follows the path ABCD of FIG. 1*a*, and the time delay between saturated states equals the flux change BC divided by a rate of change, which is determined chiefly by the resistance of the closed circuit loop through winding 23 and transistor 27 as hereinbefore explained. The output winding current pulse for this transition is illustrated in FIG. 1*b*. The flux path when the core 20 shifts from positive to negative is DEFA of FIG. 1*a*. FIG. 1*c* shows this pulse stretched out with shift delay equaling the flux change EF divided by another rate of change, the two flux changes being necessarily equal and opposite, but the rates of change, and therefore the time delays, being generally unequal because the resistances of the two circuit loops comprising windings 23 and 24 are unlikely to be exactly the same.

FIG. 5*b* of the accompanying figures coordinates the flux path with the saturable core output per FIG. 5*a*. Just as the flux path reaches the position C (FIG. 5*b*), the trailing edge of the dial pulse interrupts the operation of relay 26 and causes the core 20 to start towards negative saturation from the C point of positive saturation that it had reached and it follows path CEF. As explained earlier, since the time required to completely change the saturation state is greater than the length of a dial pulse, the most positively saturated point at which the dial pulse in interrupted (C) is not the maximum point.

This can be seen in FIG. 5*b* where the path of flux from the negative to positive saturated conditions start at F and follows the path FBC, and from positive to negative saturations follows the path CEF. As soon as the dial pulse is interrupted, as indicated at C, the flux immediately starts to decay and an output pulse in winding 24 occurs during the time EF. In this case, since the duty cycle of the incoming dial pulses is illustrated as 40 percent (interdigital pause is one and a half times the length of a dial pulse), the negative output pulse resulting from positive to negative saturation is longer than the positive output pulse generated by the leading edge of the incoming dial pulse. These factors are taken into account and, if the single core circuit of FIG. 2 is properly balanced, i.e. the rate of flux change from B to C is exactly 1.5 times the rate from E to F, as will be discussed more in detail below, the output waveform from the saturable core will appear as in 5*b* and the flux path FBCE will correlate therewith as is illustrated in FIG. 5*a*.

However, what ordinarily happens when a single core is employed, due to the difference in switching transistors and other circuit parameters—not to mention the peculiar characteristics of the particular saturable core employed—is that the flux paths for the core shifts are not precisely balanced and will not remain in balance over extended periods of time, nor will the proper balance for one duty cycle be correct for another. Thus, the flux path in one case might look as it does in FIG. 6*b*. This unbalance produces an output waveform as illustrated in FIG. 6*a*. It will be noted here that since the flux path starts at its most negative condition (point A) but never rises equally far above the H-axis, that there is a discontinuity, that is, an output pulse across winding 24 does not immediately follow one across winding 23. This discontinuity occurs between the pulses representing the leading and trailing edges of the incoming dial pulses and is undesirable in most applications. At least in a two-frequency inband signaling system, the break makes it difficult to synchronize the receiver and transmitter after a circuit interruption. The unbalanced situation opposite to that of FIG. 6 is illustrated in FIG. 7. In this case the discontinuity between the output positive and negative pulses occurs in the transition from the leading edge to the trailing edge. Which of these two situations will obtain in a given circuit in accordance with FIG. 2 is purely problematical, and not too important, since it is the presence of any discontinuity between the two pulses that raises difficulties. They must be eliminiated in the ideal case.

The two core embodiment illustrated in FIG. 3 is designed to eliminate this discontinuity without requiring careful attention to duty cycles, circuit parameters, etc. By employing a pair of saturable cores, one to generate the leading edge pulse and the other to generate the trailing edge pulse, and then combining their outputs, the circuit can be rendered reasonably independent of duty cycles and circuit parameters. It is easy enough to assure the unbalanced flux paths exemplified in FIGS. 6*a* and 7*a*; e.g., in the illustrated embodiment this is assured automatically by the asymmetric impedance properties of the transistors. That is, transistor 52 readily conducts current from its emitter to its base and so through winding 60 in one direction, which effectively opposes and delays reversal of the flux in core 50 responsive to receipt of an incoming pulse; but the same transistor presents relatively high impedance to current flow in the other direction, so that the return shift in magnetic flux within core 50 occurs much more rapidly. This simple expedient is taken advantage of in the dual core system. In the case of the output pulse B—C which recreates the leading edge of an incoming dial pulse, the hysteresis loop of the core 50 is purposely unbalanced (by the transistor asymmetry) toward the negatively saturated condition, as in FIG. 6*b*. In the case of the output E—F pulse which recreates the trailing edge of the incoming dial pulse, the hysteresis loop of the core 51 is unbalanced (by transistor asymmetry) toward the positively saturated condition, as illustrated in FIG. 7*b*. With this arrangement and, provided that the duty cycle is not so extreme as to have the dial pulse or the interdigital pause so long that one of them exceeds the time for the saturable core to fully shift from its negative to positive or positive to negative condition, the circuit is independent of duty cycles as well as reasonable variations of circuit parameters. It might be noted, parenthetically, that if this adverse situation does arise, the discontinuity between pulses occurs again.

Looking particularly to FIG. 3 which illustrates a dual core embodiment, it will be seen to include a pair of cores 50 and 51 associated with switching transistors 52 and 53, respectively. Core 50 has two primary windings 55 and 56, whereas core 51 has primary windings 57 and 58. An output winding 60 associated with core 50 has one terminal connected to the base of switching transistor 52, and the other terminal connected to ground. The output winding 61 associated with core 51 is connected at one terminal to ground and at the other terminal to the base of switching transistor 53. The emitters of switching transistors 52 and 53 are commoned through a resistor 65 to ground and through a voltage divider resistor 66 to the negative terminal of voltage source 25. The oscillators 30 and 31 for frequencies $f_1$ and $f_2$, have one terminal commoned to one side of the coupling transformer 29 of the transmission path including conductors T and R. The other outputs of the oscillators 30 and 31 are respectively connected to the collectors of switching transistors 52 and 53, and the other terminal of coupling transformer 29 is connected to the emitters of transistors 52 and 53. In this embodiment, the negative bias voltage applied to the transistor emitters assures that the transistors will always be nonconductive unless a negative voltage is applied to their bases. This is especially desirable here because the rectifier bridges are omitted and A.C. is supplied to the collectors by the two oscillators.

The negative terminal of battery 25 is also connected through a manually operated on-off switch $S_1$, dropping resistor 67, and primary winding 55 to ground. The same source of voltage 25 is connected through the switch $S_1$, dropping resistor 68 and primary winding 57 of output core 51 to ground. These two windings 55, 57 associated with respective cores 50, 51 bias the cores to a normally negatively saturated condition. The negative source 25 is also connected through resistor 69 to one terminal of the primary winding 56 of saturable core 50 and through resistor 70 to one terminal of the winding 58 of a saturable core 51. The other terminals of windings 56 and 58 are commoned to front contact 1 of the signal input relay 26. One side of the winding of relay 26 is connected to the negative terminal of voltage source 25 and the other side is connected to the input signaling line for the application of a ground potential from the incoming dial pulses. Whenever signals are impressed on the input terminal of relay 26, the relay operates to place ground over front contact 1 to the open side of the windings 56 and 58 associated with respective saturable cores 50 and 51.

With the switches $S_1$ closed and cores 50 and 51 normally biased by windings 55 and 57, the presence of the leading edge of an input dial pulse operates relay 26 and places ground on the windings 56 and 58. These windings are polarized and their dropping resistors chosen so they can override the biasing effects of input windings 55 and 57 (i.e., bucking windings 56 and 58 provide greater ampere-turns magnetizing forces than do bias windings 55 and 57) and, as the flux decays and builds up positively in the core 50, an output pulse is developed across output winding 60, having a negative polarity at the base of transistor 52. Thereafter, switching transistor 52 operates to place oscillator 30 across coupling transformer 29. While the pulse across winding 60 causes transistor 52 to conduct, its counterpart across the winding 61 of core 51 is maintaining switching transistor 53 cut off. At the interruption of the dial pulse, i.e., at its trailing edge, the current paths through windings 56 and 58 are interrupted and normal bias circuits including windings 55 and 57 take over. The reversion to its original polarity of the flux in core 50 now produces a pulse in winding 60 which cuts off transistor 52. At the same time, the bias circuit including winding 57 causes the flux in core 51 to revert and so develops a pulse in winding 61 which causes transistor 53 to conduct.

To recepitulate, whenever the leading edge of a dial pulse is detected by the operation of switching relay 26, switching transistor 52 is caused to conduct and switching transistor 53 is cut off. This connects oscillator 30 across the coupling transformer 29 and places a burst of $f_1$ signal on conductors T and R. When the trailing edge of the input dial pulse appears, which causes switching relay 26 to release, switching transistor 52 cuts off which removes oscillator 30 from across coupling transformer 29 and switching transistor 53 conducts. This latter action places $f_2$ oscillator 31 across the transformer 29. The result is a series of alternate bursts of $f_1$ and $f_2$ signals as illustrated in FIG. 11.

Since the core 50 provides only the part B–C of the saturable core output, by causing switching transistor 52 to conduct, this part of the output pulse across winding 60 can be stretched to more than adequately cover the width of the dial pulse by judicious choice of the circuit parameters. In a similar vein, since the change to the absence-of-pulse condition causes a negative going pulse across winding 61 associated with saturable core 51, which causes transistor 53 to conduct throughout portion E–F of the pulse waveform, this portion can be stretched out to sufficiently encompass the interdigital pause corresponding to any reasonable duty cycle which might be employed in a pulse conversion system. By stretching out these utilized parts of the cores' outputs across windings 60 and 61, it is apparent that the pulses of opposite polarity which result from the non-stretched parts are probably substantially shorter than that necessary to provide a balanced pattern as illustrated in FIG. 5*a*. But, since these are thrown away (are not conducted by the transistors) their characteristics are not important. It is only necessary to be certain that the portions of the voltages induced in windings 60 and 61 that cause transistors 52 and 53 to conduct are sufficient in length to cover the intervals desired. FIGS. 8, 9 and 10 exemplify the two core circuit described above. FIG. 8 represents the pulse in winding 60 of core 50 after the part B—C has been stretched. Note that the part of the induced voltage which is not used (which causes no substantial conduction of current by the transistors) is over before the next positive pulse begins (dotted lines). FIG. 9 represents the part E—F of the pulse in winding 61 of core 51 after it has been stretched. Here too the non-useful part (dotted lines) is discarded. FIG. 11 represents the total current in windings 60 and 61, comparable to the balanced situation of FIG. 5*a*, achieved without the critical dimensioning of circuit parameters required in the single core embodiment.

While the pulse generating circuit of the present invention has been described with respect to two exemplary embodiments, one of which depends upon balance to perform ideally, at least in some situations, and the other of which is substantially independent of duty cycles and circuit parameters, it is obvious that numerous other arrangements may be made by those skilled in the art without departing from the spirit and scope of the invention. Thus, while two embodiments are described in detail, the scope of the invention is intended to be limited only by the claims.

What is claimed is:

1. Apparatus for transmitting signals of two different frequencies alternately responsive to incoming pulses, said apparatus comprising a saturable core, means responsive to incoming pulses to cause said core to shift from a saturated state of one polarity to that of the other and to the absence of pulses to reshift, an output winding upon said core providing induced pulses of alternate polarities while said core is so shifting and reshifting, an output circuit, a source of fixed-frequency signals, switching means connected to said output winding and controlled by said induced pulses for connecting said source to said output circuit and supplying said fixed-frequency signals thereto during one polarity only of said induced pulses, and means for supplying signals of another fixed frequency to said output circuit during intervals between said one polarity of induced pulses.

2. Apparatus for transmitting signals of two different frequencies alternately responsive to incoming pulses, said apparatus comprising a saturable core having a pair of input windings and at least one output winding, means including one of said input windings to normally urge said core toward one of its two magnetic saturated states, means including the other of said input windings and responsive to the leading edge of each of said incoming pulses to cause said core to start to shift from said normal state to the other state thereby to induce a pulse of one polarity in said output winding during the time core is in shift transition from said normal to said other state and responsive to the trailing edge of each of said incoming pulses to cause said core to start to shift from said other state to said normal state thereby to induce a pulse of another polarity in said output winding during the time said core is in shift transition from said other state to said normal state, an output circuit, a source of fixed-frequencies signals, switching means connected to said output winding and controlled by said induced pulses for connecting said source to said output circuit and supplying said fixed-frequency signal thereto only during said induced pulses of one polarity, and means for supplying signals of another fixed frequency to said output circuit during intervals between said induced pulses of one polarity.

3. Apparatus for transmitting signals of two different frequencies alternately responsive to incoming signal pulses, said apparatus comprising a saturable core having a pair of input windings, means including one of said input windings to urge said core towards a normally saturated state of one polarity, means including the other one of said input windings and responsive to the leading edge of each one of said signal pulses to cause said core to start to shift from said normal state to the other saturated state, first and second output windings associated with said core, said first winding having a pulse of one polarity induced therein during the time said core is shifting from said normal state to said other state in response to the presence of an incoming pulse, said second output winding having a pulse of said one polarity induced therein during the time said core is reshifting to said normal state in response to the absence of an incoming pulse, a first transistor connected to said first output winding and controlled thereby to be substantially conductive only during the pulses of said one polarity induced therein, a second transistor connected to said second output winding and controlled thereby to be substantially conductive only during the pulses of said one polarity induced therein, an output circuit, first and second oscillators tuned to different fixed frequencies, means including said first transistor for effectively connecting said first oscillator to said output circuit only while said first transistor is conductive, and means including said second transistor for effectively connecting said second oscillator to said output circuit only while said second transistor is conductive.

4. Apparatus for transmitting signals of two different frequencies alternately responsive to incoming pulses, said apparatus comprising two similar saturable magnetic cores each provided with input and output winding, means for biasing both cores substantially to magnetic saturation in one direction of magnetization, means including said input winding for reversing the magnetizations of said cores responsive to and during each incoming pulse, whereby voltages of one polarity are induced in each output winding as the direction of magnetization reverses responsive to an incoming pulse and voltages of reverse polarity are induced in each output winding as the magnetization reverts to said one direction following each incoming pulse, an asymmetrically conductive device connected across one of said output windings for delaying said reversal of flux in one core, an asymmetrically conductive device connected across the other output winding for delaying said reversion of flux in the other core, whereby currents flow through said output windings alternately in substantially uninterrupted succession during a sequence of incoming pulses, and output circuit means controlled by said currents.

5. Pulse translating apparatus, comprising two similar magnetic cores, means biasing each of said cores substantially to saturation in one direction of magnetization, input windings upon both of said cores, means for applying to said input windings pulses of current each sufficient to reverse the magnetizations of both cores, the magnetizations of said cores reverting to said one direction under influence of said bias means following each such pulse, two separate output windings, one upon each of said cores, first and second transistors each having an emitter and a base and a collector, one of said output windings being connected between the base and the emitter of said first transistor and poled so that said first transistor conducts current while the magnetization of the core is being reversed by a pulse applied to the input windings, the other of said output windings being connected between the base and the emitter of said second transistor and poled so that said second transistor conducts current while the magnetization of the core is reverting to said one direction, and output circuit means connected to the collectors of said transistors.

References Cited in the file of this patent

UNITED STATES PATENTS

| | | |
|---|---|---|
| 2,666,151 | Rajchman et al. | Jan. 12, 1954 |
| 2,840,726 | Hamilton | June 24, 1958 |
| 2,892,103 | Scarbrough | June 23, 1959 |
| 2,899,570 | Johannesen | Aug. 11, 1959 |
| 2,939,115 | Bobeck | May 31, 1960 |
| 2,956,244 | Finkel | Oct. 11, 1960 |
| 2,959,686 | Guterman | Nov. 8, 1960 |
| 2,959,687 | Eckert | Nov. 8, 1960 |
| 2,966,595 | Williams | Dec. 27, 1960 |
| 2,991,457 | Hoffman | July 4, 1961 |